(12) United States Patent
Liu et al.

(10) Patent No.: US 12,176,488 B2
(45) Date of Patent: Dec. 24, 2024

(54) ELECTROCHEMICAL DEVICE AND ELECTRONIC DEVICE CONTAINING SAME

(71) Applicant: Ningde Amperex Technology Limited, Ningde (CN)

(72) Inventors: Junfei Liu, Ningde (CN); Shuirong Zhang, Ningde (CN); Chao Tang, Ningde (CN); Jianming Zheng, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 457 days.

(21) Appl. No.: 17/569,307

(22) Filed: Jan. 5, 2022

(65) Prior Publication Data

US 2022/0131196 A1  Apr. 28, 2022

Related U.S. Application Data

(63) Continuation of application No. PCT/CN2020/081846, filed on Mar. 27, 2020.

(51) Int. Cl.
*H01M 10/0567* (2010.01)
*H01M 4/505* (2010.01)
(Continued)

(52) U.S. Cl.
CPC ....... *H01M 10/0567* (2013.01); *H01M 4/505* (2013.01); *H01M 4/525* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 10,741,840 B2 | 8/2020 | Ham et al. |
| 2013/0122378 A1 | 5/2013 | Oh et al. |

(Continued)

FOREIGN PATENT DOCUMENTS

| CN | 1685542 A | 10/2005 |
| CN | 1877897 A | 12/2006 |

(Continued)

OTHER PUBLICATIONS

Office Action issued Dec. 9, 2020 in China Patent Application No. 202010232173.1 with English translation; 21 pgs.

(Continued)

*Primary Examiner* — Alix E Eggerding
(74) *Attorney, Agent, or Firm* — Maier & Maier, PLLC

(57) ABSTRACT

An electrochemical device includes a positive electrode, a negative electrode, a separator located between the positive electrode and the negative electrode, and an electrolytic solution. The positive electrode includes a positive current collector and a positive active material layer disposed on the positive current collector. The positive active material layer includes a positive active material. The positive active material includes an element A. The element A is selected from at least one of Al, B, Ca, Mg, Ti, Cu, Nb, Si, Zr, Y, or W. The electrolytic solution includes at least one of 1,3-propane sultone or a derivative thereof. A mass ratio of the element A in the positive active material to 1,3-propane sultone or a derivative is 1:0.2 to 1:50.

20 Claims, 1 Drawing Sheet

(51) Int. Cl.
  H01M 4/525 (2010.01)
  H01M 10/0525 (2010.01)
  H01M 4/02 (2006.01)

(56) References Cited

U.S. PATENT DOCUMENTS

| | | | |
|---|---|---|---|
| 2014/0272604 A1 | 9/2014 | Lim et al. | |
| 2016/0104880 A1 | 4/2016 | Gao et al. | |
| 2017/0250445 A1* | 8/2017 | Burkhardt | H01M 10/0569 |
| 2019/0074513 A1 | 3/2019 | Ham et al. | |
| 2020/0335824 A1 | 10/2020 | Xia et al. | |
| 2022/0216515 A1* | 7/2022 | Liu | H01M 4/62 |

FOREIGN PATENT DOCUMENTS

| | | |
|---|---|---|
| CN | 103367803 A | 10/2013 |
| CN | 103682440 A | 3/2014 |
| CN | 104428942 A | 3/2015 |
| CN | 104681868 A | 6/2015 |
| CN | 106025356 A | 10/2016 |
| CN | 106133988 A | 11/2016 |
| CN | 108550912 A | 9/2018 |
| CN | 109378524 A | 2/2019 |
| CN | 109428076 A | 3/2019 |
| CN | 109935891 A | 6/2019 |
| CN | 110265716 A | 9/2019 |
| CN | 110600804 A | 12/2019 |
| CN | 110660962 A | 1/2020 |
| CN | 105845983 B | 2/2020 |
| JP | 2007294397 A | 11/2007 |
| JP | 2008270086 A | 11/2008 |
| JP | 2009283353 A | 12/2009 |
| JP | 2012174340 A | 9/2012 |
| JP | 201435953 A | 2/2014 |
| JP | 2014160568 A | 9/2014 |
| JP | 201662689 A | 4/2016 |
| JP | 201681609 A | 5/2016 |
| JP | 2017212339 A | 11/2017 |
| JP | 20186046 A | 1/2018 |
| JP | 2020-13881 A | 1/2020 |
| KR | 10-2019-0026571 A | 3/2019 |
| KR | 1020190116584 A | 10/2019 |
| WO | 2019017567 A1 | 1/2019 |
| WO | 2019151724 A1 | 8/2019 |

OTHER PUBLICATIONS

International Search Report and Written Opinion of the International Searching Authority issued Dec. 29, 2020 in International Application No. PCT/CN2020/081846 with English translation; 12 pgs.
Office Action issued on Dec. 9, 2020, in corresponding Chinese Application No. 202010232173.1, 22 pages.
Notification of Grant of Invention Patent Rights issued on Feb. 26, 2021, in corresponding Chinese Application No. 202010232173.1, 8 pages.
Office Action issued on Mar. 28, 2023, in corresponding Indonesian Application No. P00202203852, 6 pages.
Examination Report issued on Nov. 24, 2022, in corresponding Indian Application No. 202127048522, 5 pages.
Office Action issued on Jul. 19, 2022, in corresponding Japanese Application No. 2021-523451, 16 pages.
Decision to Grant a Patent issued on May 16, 2023, in corresponding Japanese Application No. 2021-523451, 4 pages.
Office Action issued on Nov. 29, 2022, in corresponding Japanese Application No. 2021-523451, 15 pages.
Office Action issued on Dec. 13, 2022, in corresponding Korean Application No. 10-2021-7012868, 13 pages.
Notice of Allowance issued on Oct. 4, 2023, in corresponding Korean Application No. 10-2021-7012868, 4 pages.
Office Action issued on Jun. 7, 2023, in corresponding Korean Application No. 10-2021-7012868, 8 pages.
Extended European Search Report issued on May 10, 2022, in corresponding European Application No. 20926574.3, 11 pages.
Bhargav et al., "Unique Chemistry of Thiuram Polysulfides Enables Energy Dense Lithium Batteries", Journal of Materials Chemistry A, Nov. 2017, 10 pages.
Office Action issued on Aug. 30, 2024, in corresponding Chinese Application No. 202110335485.X, 16 pages.

* cited by examiner

ELECTROCHEMICAL DEVICE AND ELECTRONIC DEVICE CONTAINING SAME

CROSS REFERENCE TO RELATED APPLICATIONS

The present application is a continuation of International Application No. PCT/CN2020/081846, filed on Mar. 27, 2020, the disclosure of which is hereby incorporated by reference in its entirety.

TECHNICAL FIELD

This application relates to the technical field of energy storage, and in particular, to an electrochemical device and an electronic device containing same.

BACKGROUND

With the popularization and application of smart products, people's demand for electronic products such as a mobile phone, a notebook computer, and a camera is increasing every year. An electrochemical device serving as a power supply of the electronic products is increasingly important in our daily lives. Lithium-ion batteries are widely applied in the fields such as smart products, electric vehicles, electrical tools, unmanned aerial vehicles, smart robots, advanced weapon equipment, and large-scale energy storage due to advantages such as a high energy density, a high working voltage, a light weight, a low self-discharge rate, a long cycle life, no memory effect, and environmental friendliness.

However, with the wide application of the electrochemical devices in various fields, people are imposing higher requirements on the electrochemical devices. For example, people not only require a long service life of an electrochemical device, but also require ensured safety of using the electrochemical device. Especially, after frequent occurrence of the problems in the market such as battery swelling and automatic shutdown of electronic products and combustion or explosion after a period of use of the products, the requirements on the safety of the electrochemical devices during use are elevated to a new height. In other words, it is currently urgent to develop an electrochemical device characterized by both a long service life and high safety.

SUMMARY

This application provides an electrochemical device and an electronic device that applies the electrochemical device in an attempt to solve at least one problem in the related art to at least some extent.

According to an aspect of this application, this application provides an electrochemical device. The electrochemical device includes a positive electrode, a negative electrode, a separator located between the positive electrode and the negative electrode, and an electrolytic solution. The positive electrode includes a positive current collector and a positive active material layer disposed on the positive current collector. The positive active material layer includes a positive active material. The positive active material includes an element A. The element A is at least one selected from the group consisting of Al, B, Ca, Mg, Ti, Cu, Nb, Si, Zr, Y, or W. The electrolytic solution includes at least one compound represented by Formula (I):

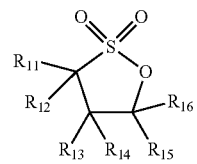
Formula (I)

where $R_{11}$, $R_{12}$, $R_{13}$, $R_{14}$, $R_{15}$, and $R_{16}$ are each independently selected from any combination of: H, F, Cl, Br, I, phenyl, and substituted or unsubstituted $C_1$-$C_8$ hydrocarbyls, and a mass ratio of the element A in the positive active material to the compound represented by Formula (I) is 1:0.2 to 1:50.

According to an embodiment of this application, the compound represented by Formula (I) includes at least one of

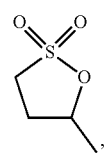
Formula (I-1)

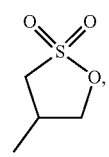
Formula (I-2)

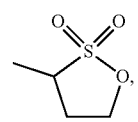
Formula (I-3)

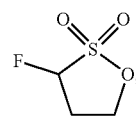
Formula (I-4)

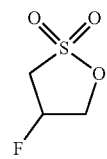
Formula (I-5)

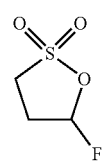
Formula (I-6)

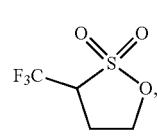
Formula (I-7)

-continued

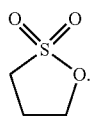
Formula (I-8)

According to an embodiment of this application, the electrolytic solution includes a compound represented by Formula (I-8) and at least one of compounds represented by Formula (I-1) to Formula (I-7), where a mass ratio of a total mass of the at least one of compounds represented by Formula (I-1) to Formula (I-7) to a mass of the compound represented by Formula (I-8) is greater than 2:1.

According to an embodiment of this application, the electrolytic solution further includes $LiPO_2F_2$, and a mass ratio of the element A to $LiPO_2F_2$ is 1:0.01 to 1:20.

According to an embodiment of this application, the electrolytic solution further includes a compound represented by Formula (II),

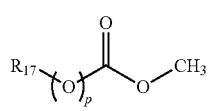
Formula (II)

where $R_{17}$ is a substituted or unsubstituted $C_1$-$C_8$ alkyl, p is 0 or 1, and a content of the compound represented by Formula (II) is less than or equal to 20%, based on a total mass of the electrolytic solution.

According to an embodiment of this application, the electrolytic solution further includes a first additive. The first additive includes at least one of vinylene carbonate (VC), fluoroethylene carbonate (FEC), ethylene sulfate (ES), tris(trimethylsilyl)phosphate (TMSPi), tris(trimethylsilyl)borate (TMSB), triallyl phosphate (TPP), adiponitrile (ADN), succinonitrile (SN), 1,3,6-hexanetricarbonitrile (HTCN), 1,2,6-hexanetricarbonitrile, or 1,3,5-pentanetricarbonitrile.

According to an embodiment of this application, a content of the first additive accounts is 0.1% to 20%, based on a total mass of the electrolytic solution.

According to an embodiment of this application, the electrolytic solution further includes a second additive. The second additive includes at least one of lithium tetrafluoroborate ($LiBF_4$), lithium bis(fluorosulfonyl)imide (LiFSI), lithium bis(trifluoromethylsulfonyl)imide (LiTFSI), lithium 4,5-dicyano-2-(trifluoromethyl)imidazole (LiTDI), lithium difluorobis(oxalato)phosphate (LiDFOP), lithium difluoro(oxalato)borate (LiDFOB), or lithium bis(oxalato)borate (LiBOB).

According to an embodiment of this application, a content of the second additive accounts is 0.1% to 5%, based on a total mass of the electrolytic solution.

According to an embodiment of this application, the positive active material layer includes first particles, a circularity of each first particle is greater than or equal to 0.4, and a cross-sectional area of the first particle is greater than or equal to 20 µm²; and, based on a total area of a cross section of the positive electrode with the cross section being perpendicular to the current collector, a percentage of a total cross-sectional area of the first particles is 10% to 50%.

According to an embodiment of this application, the first particles include broken particles; and, based on the total area of the first particles, a total area of the broken particles is less than or equal to 30%.

According to an embodiment of this application, the positive active material layer includes second particles, a circularity of each second particle is less than 0.4, and a cross-sectional area of the second particle is less than 20 µm²; and, based on a total area of a cross section of the positive electrode with the cross section being perpendicular to the current collector, a percentage of a total cross-sectional area of the second particles is 10% to 60%.

In some embodiments, a porosity of the positive electrode is ≤25%.

In some embodiments, based on a cross-sectional area of the positive electrode with the cross section being perpendicular to the current collector, a percentage of a cross-sectional area of the positive current collector is 5% to 20%.

According to an embodiment of this application, the positive active material includes at least one of a compound represented by Formula III or a compound represented by Formula IV:

$$Li_nNi_{1-a-b-c}Co_aMn_bA_cO_{2-m}D_m \quad (III)$$

where, 0.90≤n≤1.10, 0.05≤a≤0.3, 0.002≤b≤0.3, 0.001≤c≤0.1, 0≤m≤0.05, and 0.60<1−b−c<0.95;

$$LiCoA_eO_{2-f}D_f \quad (IV)$$

where 0.001≤e≤0.1, and 0≤f≤0.1.

D is at least one selected from S, F, N, Cl, or I.

According to an embodiment of this application, the separator includes a substrate layer and a surface treatment layer, the surface treatment layer includes inorganic ceramic particles, and a thickness ratio of the substrate layer to the surface treatment layer is 2:1 to 20:1.

According to an aspect of this application, this application provides an electronic device, including the electrochemical device according to this application.

In at least one aspect, by adding the compound represented by Formula (I) into the electrolytic solution, doping the positive active material with the element A, and adjusting the mass ratio of the element A in the positive active material to the compound represented by Formula (I), this application can effectively improve the cycle stability of the electrochemical device and effectively mitigate gas generation of the electrochemical device.

Additional aspects and advantages of this application will be described or illustrated in part later herein or expounded through implementation of the embodiments of this application.

BRIEF DESCRIPTION OF DRAWINGS

For ease of describing the embodiments of this application, the following outlines the drawings necessary for describing the embodiments of this application or the prior art. Apparently, the drawings outlined below are merely a part of embodiments in this application. Without making any creative efforts, a person skilled in the art can still obtain the drawings of other embodiments according to the structures illustrated in these drawings.

DETAILED DESCRIPTION OF EMBODIMENTS

Figure 1A:
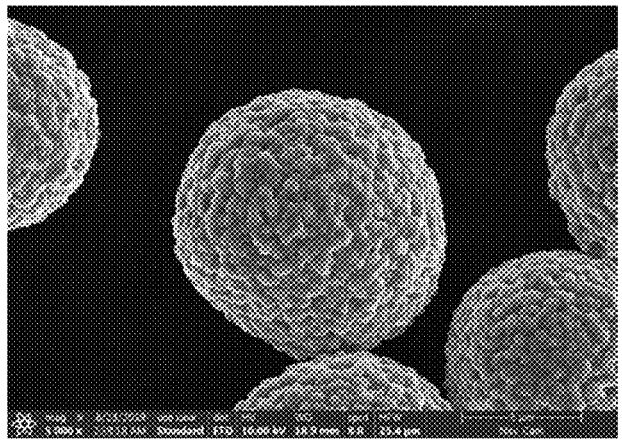
FIG. 1A and FIG. 1B show a morphology of a polycrystalline positive active material and a morphology of a monocrystalline-like positive active material respectively.

Embodiments of this application will be described in detail below. Throughout the specification of this application, the same or similar components and the components having the same or similar functions are denoted by similar reference numerals. The embodiments described herein with reference to the accompanying drawings are illustrative and graphical in nature, and are intended to enable a basic understanding of this application. The embodiments of this application shall not be construed as a limitation on this application.

The term "approximately" used herein is intended to describe and represent small variations. When used with reference to an event or situation, the terms may denote an example in which the event or situation occurs exactly and an example in which the event or situation occurs very approximately. For example, when used together with a numerical value, the term may represent a variation range falling within ±10% of the numerical value, such as ±5%, ±4%, ±3%, ±2%, ±1%, ±0.5%, ±0.1%, or ±0.05% of the numerical value. For example, if a difference between two numerical values falls within ±10% of an average of the numerical values (such as ±5%, ±4%, ±3%, ±2%, ±1%, ±0.5%, ±0.1%, or ±0.05% of the average), the two numerical values may be considered "approximately" the same.

In addition, a quantity, a ratio, or another numerical value is sometimes expressed in a range format herein. Understandably, such a range format is for convenience and brevity, and shall be flexibly understood to include not only the numerical values explicitly specified and defined in the range, but also all individual numerical values or sub-ranges covered in the range as if each individual numerical value and each sub-range were explicitly specified.

In the description of specific embodiments and claims, a list of items referred to by using the terms such as "one or more of", "one or more thereof", "one or more types of" or other similar terms may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements.

The term "circularity" means the degree to which a figure of the cross section of a particle is as circular as a theoretical circle. Circularity R=(4π×area)/(perimeter×perimeter). When R is 1, the figure is circular; the smaller the value of R, the more irregular the figure, and the greater the deviation of the figure from a circle. In this application, the circularity of the particles of the positive active material is measured by using a circularity meter. For the specific measurement method, refer to the specific embodiments described below.

The term "broken particles" means continuous wrinkle lines not less than 0.1 μm in length and not less than 0.01 μm in width in a cross section of a particle in an image obtained by using a scanning electron microscope. The wrinkle lines of such size are regarded as cracks, and particles with cracks are regarded as broken particles.

The term "hydrocarbyl" means a group containing elements C and H. For example, the hydrocarbyl may include an alkyl, an alkenyl, an alkynyl, and an aryl. The hydrocarbyl covers linear and branched chain hydrocarbyl groups. For example, the hydrocarbyl may be a $C_1$-$C_{50}$ hydrocarbyl, a $C_1$-$C_{40}$ hydrocarbyl, a $C_1$-$C_{30}$ hydrocarbyl, a $C_1$-$C_{20}$ hydrocarbyl, a $C_1$-$C_{12}$ hydrocarbyl, a $C_1$-$C_{10}$ hydrocarbyl, a $C_1$-$C_8$ hydrocarbyl, a $C_1$-$C_6$ hydrocarbyl, a $C_2$-$C_6$ hydrocarbyl, or a $C_2$-$C_5$ hydrocarbyl. In addition, the hydrocarbyl may be optionally substituted.

The term "alkyl" covers linear and branched chain alkyl groups. For example, an alkyl may be a $C_1$-$C_{50}$ alkyl, a $C_1$-$C_{40}$ alkyl, a $C_1$-$C_{30}$ alkyl, a $C_1$-$C_{20}$ alkyl, a $C_1$-$C_{12}$ alkyl, a $C_1$-$C_{10}$ alkyl, a $C_1$-$C_6$ alkyl, a $C_2$-$C_6$ alkyl, or a $C_2$-$C_5$ alkyl. In some embodiments, the alkyls include methyl, ethyl, propyl, isopropyl, butyl, isobutyl, tert-butyl, pentyl, hexyl, heptyl, octyl, and the like. In addition, the alkyl group may be optionally replaced.

A substituent in the substitution may be independently selected from a silyl, a siloxy, an amino group, an ether group, ester group, a carboxyl, a sulfonic acid group, a mercapto group, a cyano group, a halogen, or any combination thereof.

I. Electrochemical Device

An electrochemical device generates gases when it is left in a high-temperature environment or cycled in a charge and discharge process, thereby causing the electrochemical device to swell. Severe gas generation will affect safety of using the electronic product and lead to poor experience of consumers, or even threaten the personal safety of the consumers. Therefore, one of the key factors to improve the safety of the electrochemical device is to reduce the gas generation of the electrochemical device.

It is found in this application that a main reason for the gas generation of the electrochemical device lies in side reactions occurring between the electrolytic solution and the positive active material and the negative active material, where the side reactions generate gas by-products. In addition, it is found in this application that during cold calendering of the positive electrode plate and during a charge and discharge cycle of the electrochemical device, the particles of the positive active material are prone to break. After the particles are broken, a new interface is exposed. Consequently, the electrolytic solution permeates into the particles through the cracks and performs side reactions with the positive active material located at the new interface. The side reactions exacerbate the gas generation and causes the capacity of the electrochemical device to rapidly attenuate as the charge and discharge cycles go on. In addition, in a process of charging the electrochemical device, as lithium ions are continuously deintercalated from the positive active material, the force of bonding between the active metal (such as nickel or cobalt) in the positive active material and oxygen is weakened so that oxygen is released. The released oxygen will oxidize the electrolytic solution and exacerbate the gas generation.

Based on at least the foregoing research on the gas generation, this application improves both the electrolyte system and the positive active material, and is committed to research a matching relationship between the electrolyte system and the positive active material, give full play to synergetic effects between the electrolyte system and the positive active material, and achieve an electrochemical device with little gas generation and good cycle performance.

According to some embodiments of this application, this application provides an electrochemical device. The electrochemical device includes a positive electrode, a negative electrode, a separator located between the positive electrode and the negative electrode, and an electrolytic solution. The positive electrode includes a positive current collector and a positive active material layer disposed on the positive current collector. The positive active material layer includes a positive active material. The positive active material includes an element A. The element A includes or is at least one selected from the group consisting of Al, B, Ca, Mg, Ti, Cu, Nb, Si, Zr, Y, or W. The electrolytic solution includes at least one compound represented by Formula (I):

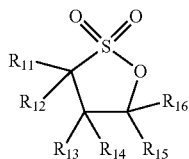

Formula (I)

where $R_{11}$, $R_{12}$, $R_{13}$, $R_{14}$, $R_{15}$, and $R_{16}$ are each independently selected from any combination of H, F, Cl, Br, I, phenyl, and substituted or unsubstituted $C_1$-$C_8$ hydrocarbyls, and a mass ratio of the element A in the positive active material to the compound represented by Formula (I) is 1:0.2 to 1:50.

The compound represented by Formula (I) is at least one of 1,3-propane sultone or a derivative thereof. The compound represented by Formula (I) is added into the electrolytic solution as an additive to form a stable solid electrolyte interface (SEI) film on the surface of the particles of the positive active material, so as to reduce the side reactions between the positive active material and the electrolytic solution. The positive active material is doped or coated with the element A to improve the structural stability of the material itself and reduce release of oxygen, and on the other hand, to interact synergistically with the compound represented by Formula (I) to stabilize the surface of the particles of the positive active material and reduce the side reactions.

In addition, the mass ratio of the element A in the positive active material to the compound represented by Formula (I) is adjusted to not only suppress too rapid increase of the resistance and reduce loss of the cycle capacity in an early period of cycles, but also mitigate the gas generation problem caused by breakage of the material in a later period of cycles. When the mass ratio of the element A in the positive active material to the compound represented by Formula (I) is 1:0.2 to 1:50, the electrochemical device can exert excellent electrochemical performance.

When a too large amount of compound represented by Formula (I) is added in contrast to the element A with which the positive active material is doped or coated, the too large amount of the compound represented by Formula (I) will participate in forming the SEI film in the early period of the charge and discharge cycles, thereby possibly leading to a too thick SEI film. Although the SEI film helps to protect the positive active material, the too thick SEI film will lead to a rapid increase of a charge transfer resistance at the surface of the positive active material and result in a loss of cycle capacity. When a too small amount of the compound represented by Formula (I) is added in contrast to the element A with which the positive active material is doped or coated, the particles of the positive active material are broken in the later period of the charge and discharge cycles, and the content of the compound represented by Formula (I) in the electrolytic solution may be not enough to participate in forming the SEI film at the new interface, thereby making it difficult to improve the cycle stability of the electrochemical device and difficult to suppress gas generation in the later period of cycles.

As an example but without limitation, the compound represented by Formula (I) includes or is selected from at least one of

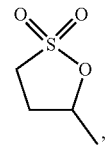

Formula (I-1)

,

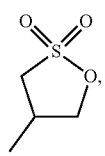

Formula (I-2)

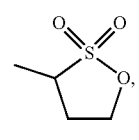

Formula (I-3)

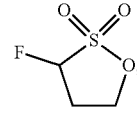

Formula (I-4)

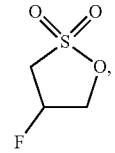

Formula (I-5)

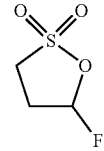

Formula (I-6)

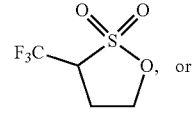

Formula (I-7)

, or

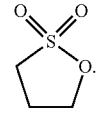

Formula (I-8)

.

In some embodiments, the electrolytic solution includes both 1,3-propane sultone (that is, the compound represented by Formula (I-8)) and at least one derivative of the 1,3-propane sultone. In some embodiments, the derivative of the 1,3-propane sultone includes or is selected from at least one of the compounds represented by Formula (I-1) to Formula (I-7).

The derivative of the 1,3-propane sultone changes the composition of the SEI film by adding a substituent without changing an overall structure of organic molecules. In this way, the dosage of the 1,3-propane sultone is reduced almost without reducing the cycle stability of the electrochemical device and without increasing the amount of generated gases. In some embodiments, a mass ratio of the derivative of the 1,3-propane sultone added in the electrolytic solution to the 1,3-propane sultone is greater than 2:1. In some embodiments, a mass ratio of a total weight of the at least one of the compounds represented by Formula (I-1) to Formula (I-7) to a mass of the compound represented by Formula (I-8) in the electrolytic solution is greater than 2:1. The mass ratio within such a range can reduce the dosage of the 1,3-propane sultone while maintaining the cycle stability of the electrochemical device.

In some embodiments, the electrolytic solution further includes lithium difluorophosphate ($LiPO_2F_2$), and a mass ratio of the element A in the positive active material to $LiPO_2F_2$ is 1:0.01 to 1:20. The added $LiPO_2F_2$ can further improve the cycle stability of the electrochemical device. Specifically, the added $LiPO_2F_2$ can increase the LiF component in the SEI film, so as to enhance the stability of the SEI film and further reduce the occurrence of side reactions. In addition, the mass ratio of the element A in the positive active material to $LiPO_2F_2$ may be adjusted to a value within the range of 1:0.01 to 1:20, so as to give better play to $LiPO_2F_2$ and prevent the element A from being attacked by HF in the electrolytic solution without increasing the resistance value of the surface of the positive electrode.

In some embodiments, the electrolytic solution further includes a compound represented by Formula (II), where $R_{17}$ is a substituted or unsubstituted $C_1$-$C_8$ alkyl, and p is 0 or 1:

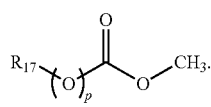

Formula (II)

The compound represented by Formula (II) and added in the electrolytic solution can reduce a transfer resistance of lithium ions during the charging and discharging of the electrochemical device, and improve the cycle performance and rate performance of the electrochemical device under normal temperatures and the discharge performance in low-temperature environments.

In some embodiments, the compound represented by Formula (II) may include at least one of

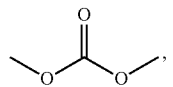

Formula(II-1)

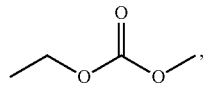

Formula(II-2)

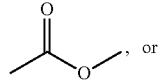

Formula(II-3)

, or

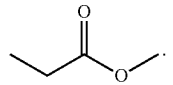

Formula(II-4)

However, the compound represented by Formula (II) is of high reactivity, and may disrupt the SEI film formed on the surface of the particles of the positive active material. Especially in the later period of the charge and discharge cycles, the continuous disruption of the SEI film by the compound represented by Formula (II) may exacerbate gas generation and reduce the cycle stability of the electrochemical device. Therefore, when the content of the compound represented by Formula (II) is controlled to be in a specific range, the cycle stability of the electrochemical device can be improved and gas generation can be reduced while good rate performance and good low-temperature performance of the electrochemical device are maintained. In some embodiments, the content of the compound represented by Formula (II) is less than or equal to 20%, based on the total mass of the electrolytic solution. In some embodiments, the content of the compound represented by Formula (II) is less than or equal to 15%, based on the total mass of the electrolytic solution.

In some embodiments, the compound represented by Formula (II) may be derived from decomposition products of diethyl carbonate, propyl propionate, ethyl propionate, and propyl acetate.

In some embodiments, the electrolytic solution further includes a first additive. The first additive includes or is selected from at least one of vinylene carbonate, fluoroethylene carbonate, ethylene sulfate, tris(trimethylsilyl)phosphate, tris(trimethylsilyl)borate, adiponitrile, succinonitrile, 1,3,6-hexanetricarbonitrile, 1,2,6-hexanetricarbonitrile, or 1,3,5-pentanetricarbonitrile.

In some embodiments, based on the total mass of the electrolytic solution, the content of the first additive is 0.01% to 30%, 0.01% to 20%, 0.01% to 10%, 0.01% to 5%, 0.1% To 30%, 0.1% to 20%, 0.1% to 10%, 0.1% to 5%, 1% to 30%, 1% to 20%, 1% to 10%, or 1% to 5%.

In some embodiments, the electrolytic solution further includes a second additive. The second additive includes or is selected from at least one of lithium tetrafluoroborate, lithium bis(fluorosulfonyl)imide, lithium bis(trifluoromethylsulfonyl)imide, lithium 4,5-dicyano-2-(trifluoromethyl) imidazole, lithium difluorobis(oxalato)phosphate, lithium difluoro(oxalato)borate, or lithium bis(oxalato)borate.

In some embodiments, based on the total mass of the electrolytic solution, the content of the second additive is 0.01% to 20%, 0.01% to 10%, 0.01% to 5%, 0.01% to 3%, 0.1% To 20%, 0.1% to 10%, 0.1% to 5%, 0.1% to 3%, 1% to 20%, 1% to 10%, 1% to 5%, or 1% to 3%.

The first additive and the second additive in this application have a relatively high reduction potential or a relatively low oxidation potential, and can form an SEI film on the surface of the positive active material before the compound represented by Formula I and the compound represented by Formula II form the SEI film, thereby reducing the side reactions between the electrolytic solution and the surface of the positive active material, and improving the cycle stability of the electrochemical device in the early period of cycles and mitigating gas production. In addition, the added first additive and second additive can also reduce the consumption of the compound represented by Formula I at the formation stage and in the early period of cycles, and ensure that the compound represented by Formula I forms a stable SEI film at a new interface in the later period of cycles, where the new interface is formed at ruptures of the particles of the positive active material. In this way, the electrochemical stability of the electrochemical device in the later period of cycles is guaranteed.

In some embodiments, in a process of preparing a positive electrode by using the particles of the positive active material, the particles of the positive active material need to be compactly pressed together through cold calendering, so as to increase a compacted density of the positive active material layer and reduce a direct-current resistance (DCR) of the electrochemical device. In addition, during the cold calendering, the positive active material layer and the positive current collector are also compactly pressed together to prevent the positive active material layer against detaching from the positive current collector during the charging and discharging of the electrochemical device. However, when a higher pressure is applied in the cold calendering process, the compacted density in the positive active material layer is higher, and the particles of the positive active material are more likely to break. In addition, a process of charging and discharging the electrochemical device is a process in which lithium ions is intercalated into and deintercalated from the particles of the positive active material. In this process, the volume of the particles of the positive active material changes drastically, thereby causing the particles to break.

To mitigate the breakage of the positive active material at a cold calendering stage of electrode preparation and in a charge and discharge process of the electrochemical device, the positive active substance adopted in this application is a mixture of positive active materials of different particle sizes, where the particles of the positive active material have different circularities and cross-sectional areas. The large and small particles used together not only increase the compacted density of the positive electrode, but also mitigate breakage of the positive active material during cold calendering and cycling, thereby improving the cycle performance of the electrochemical device and reducing gas generation.

In some embodiments, the positive active material layer includes first particles. A circularity of each first particle is greater than or equal to 0.4, and a cross-sectional area of the first particle is greater than or equal to 20 μm².

In some embodiments, the first particle is a polycrystalline particle. The polycrystalline particle is a set of numerous monocrystalline particles, and a monocrystal in the polycrystalline particle is a crystal inside which a plurality of particulate matters are regularly and periodically arranged in a three-dimensional space. As shown in FIG. 1A of this application, a morphology of the polycrystalline particle is spherical or ellipsoidal, with a relatively high circularity and a relatively large cross-sectional area.

Compared with small-sized particles, large-sized particles are more likely to break during cold calendering and the charge and discharge cycles of the electrochemical device. In some embodiments, the content of the large-sized particles in the positive active material is reduced to effectively mitigate the breakage and reduce the side reactions. In some embodiments, based on the total area of the cross section of the positive electrode with the cross section being perpendicular to the current collector, a percentage of a total cross-sectional area of the first particles is 10% to 50%.

In some embodiments, the first particles include broken particles. Based on a total area of the first particles in a cross section of the positive active material layer, a percentage of a total area of the broken particles is less than or equal to 30%, less than or equal to 28%, less than or equal to 24%, less than or equal to 20%, less than or equal to 18%, less than or equal to 15%, less than or equal to 10%, less than or equal to 5%. In some embodiments, when a discharge capacity of the electrochemical device attenuates to 80% to 90% of an initial discharge capacity, based on the total area of the first particles in the cross section of the positive active material layer, the percentage of the total area of the broken particles is less than or equal to 20%, less than or equal to 15%, less than or equal to 10%, less than or equal to 5%.

In some embodiments, the positive active material layer includes second particles. A circularity of each second particle is less than 0.4, and a cross-sectional area of the second particle is less than 20 μm².

Figure 1B:
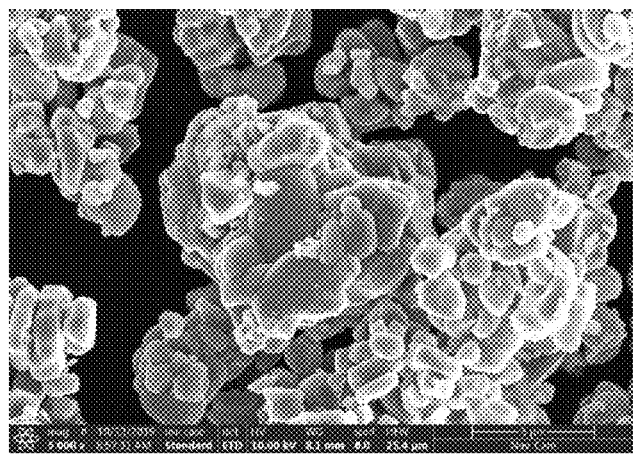

In some embodiments, the second particles include monocrystalline-like particles. A monocrystalline-like particle is a set of monocrystals that are small in number but are large in grain size. As shown in FIG. 1B of this application, a morphology of a monocrystalline-like particle B is irregular, with a relatively low circularity and a relatively small cross-sectional area.

The added second particles can effectively mitigate breakage of the first particles. To be specific, the morphology of the second particles is irregular, with a small particle size. The second particles can fill between a plurality of first particles to exert a good buffering effect and reduce rigid collisions between the first particles, so as to mitigate the breakage of the first particles and reduce side reactions. In some embodiments, based on the total area of the cross section of the positive electrode with the cross section being perpendicular to the current collector, a percentage of a total cross-sectional area of the second particles is 10% to 60%.

In some embodiments, a porosity of the positive electrode is ≤25%.

In some embodiments, based on a cross-sectional area of the positive electrode with the cross section being perpendicular to the current collector, a percentage of a cross-sectional area of the positive current collector is 5% to 20%. In some embodiments, the positive active material described in this application includes lithium, at least one active metal, and an element A. The active metal element includes or is selected from at least one of the following elements: cobalt (Co), nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), and zirconium (Zr). Specific types of the positive active material described in this application are not limited, and may be selected according to requirements.

In some embodiments, the positive active material described in this application includes a ternary material. The term "ternary material" is a ternary material known in the art, for example, a ternary material specified in *Ternary Material of Lithium-ion Batteries—Process Technology and Application in Production* (by Wang Weidong, Qiu Weihua, Ding Qianqian et al., Chemical Industry Press, May 2015). In some embodiments, the ternary material described in this application includes lithium nickel cobalt manganese oxide.

In some embodiments, the positive active material described in this application includes a compound represented by Formula III:

$$Li_nNi_{1-a-b-c}Co_aMn_bA_cO_{2-m}D_m \qquad (III)$$

where, $0.90 \leq n \leq 1.10$, $0.05 \leq a \leq 0.3$, $0.002 \leq b \leq 0.3$, $0.001 \leq c \leq 0.1$, $0 \leq m \leq 0.05$, and $0.60 < 1-b-c < 0.95$; and the element D includes or is at least one selected from S, F, N, Cl, or I.

In some embodiments, the positive active material described in this application includes lithium cobalt oxide. In some embodiments, the positive active material described in this application includes a compound represented by Formula IV:

$$LiCoA_eO_{2-f}D_f \qquad (IV)$$

where $0.001 \leq e \leq 0.1$, $0 \leq f \leq 0.1$, and the element D includes or is at least one selected from S, F, N, Cl, or I.

The positive current collector may be a positive current collector commonly used in the art, and, in some embodiments, may include but is not limited to an aluminum foil or a nickel foil.

In some embodiments, the positive active material layer further includes a binder and a conductive agent in addition to the positive active material described in this application.

The binder improves bonding between particles of the positive active material, and also improves bonding between the positive active material and the positive current collector. In some embodiments, examples of the binder include but without limitation: polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, and nylon. In some embodiments of this application, based on the total mass of the positive active material layer, the content of the binder is 1% to 5%. In some embodiments of this application, based on the total mass of the positive active material layer, the content of the binder is 1.25% to 5%.

The conductive agent may be used to enhance conductivity of the electrode. This application may use any conductive material as the conductive agent, as long as the conductive material does not cause unwanted chemical changes. In some embodiments, examples of the conductive material include but without limitation: a carbon-based material (for example, natural graphite, artificial graphite, carbon black, acetylene black, Ketjen black, and carbon fiber), a metal-based material (for example, metal powder, metal fiber, including copper, nickel, aluminum, silver, and the like), a conductive polymer (for example, a polyphenylene derivative), and any mixture thereof.

In some embodiments, the electrochemical device described in this application further includes a negative electrode. The negative electrode includes a negative active material layer and a negative current collector, and the negative active material layer includes the negative active material described herein. The negative active material can reversibly intercalate and deintercalate lithium ions. Specific types of the negative active material are not limited, and may be selected as required. In some embodiments, the negative active material may include or be selected from one or more of the following materials: a carbonaceous material, a siliceous material, an alloy material, a composite oxide material containing lithium metal, and the like. In some embodiments, examples of the carbonaceous material include but without limitation: crystalline carbon, non-crystalline carbon, and a mixture thereof. The crystalline carbon may be amorphous or flake-shaped, mini-flake-shaped, spherical or fibrous natural graphite or artificial graphite. The non-crystalline carbon may be soft carbon, hard carbon, mesophase pitch carbide, calcined coke, and the like.

In some embodiments, examples of the negative active material may include, but are not limited to, at least one of natural graphite, artificial graphite, mesocarbon microbead (MCMB for short), hard carbon, soft carbon, silicon, a silicon-carbon composite, a Li—Sn alloy, a Li—Sn—O alloy, Sn, SnO, $SnO_2$, spinel-structured lithiated $TiO_2$—$Li_4Ti_5O_{12}$, and a Li—Al alloy.

In some embodiments, the negative current collector may be a negative current collector commonly used in the art, and includes but is not limited to: a copper foil, a nickel foil, a stainless steel foil, a titanium foil, foamed nickel, foamed copper, a polymer substrate coated with a conductive metal, and any combination thereof.

In some embodiments, the negative active material layer described in this application further includes a binder and a conductive agent in addition to the negative active material described in this application. The binder and the conductive agent in the negative electrode may be made from the same materials as described above, details of which are omitted here.

In some embodiments, the electrochemical device according to this application further includes a separator disposed between the positive electrode and the negative electrode to prevent short circuit. The material and the shape of the separator used in the electrochemical device in this application are not particularly limited, and may be any material and shape disclosed in the prior art. In some embodiments, the separator includes a polymer or an inorganic compound or the like formed from a material that is stable to the electrolytic solution according to this application.

In some embodiments, the separator includes a substrate layer and a surface treatment layer. The substrate layer is a non-woven fabric, film, or composite film, which, in each case, have a porous structure. In some embodiments, the material of the substrate layer may include or be selected from at least one of polyethylene, polypropylene, polyethylene terephthalate, and polyimide. Specifically, the material of the substrate layer may be a polyethylene porous film, a polypropylene porous film, a polyethylene non-woven fabric, a polypropylene non-woven fabric, or a polypropylene-polyethylene-polypropylene porous composite film.

In some embodiments, the surface treatment layer may be, but is not limited to, a polymer layer, an inorganic layer, or a hybrid layer of a polymer and an inorganic compound.

The inorganic layer may include inorganic ceramic particles. In some embodiments, the inorganic ceramic particles may include or be selected from a combination of one or more of an aluminum oxide, a silicon oxide, a magnesium oxide, a titanium oxide, a hafnium dioxide, a tin oxide, a ceria, a nickel oxide, a zinc oxide, a calcium oxide, a zirconium oxide, an yttrium oxide, a silicon carbide, a boehmite, an aluminum hydroxide, a magnesium hydroxide, a calcium hydroxide, and a barium sulfate.

In some embodiments, the inorganic layer further includes a binder. In some embodiments, the binder may include or be selected from a combination of one or more of a polyvinylidene fluoride, a vinylidene fluoride-hexafluoropropylene copolymer, a polyamide, a polyacrylonitrile, a polyacrylate, a polyacrylic acid, a polyacrylate, a polyvinylpyrrolidone, a polyvinyl ether, a poly methyl methacrylate, a polytetrafluoroethylene, and a polyhexafluoropropylene.

In some embodiments, the polymer layer may include a polymer. In some embodiments, the material of the polymer may include or be selected from at least one of a polyamide, a polyacrylonitrile, an acrylate polymer, a polyacrylic acid, a polyacrylate, a polyvinylpyrrolidone, a polyvinyl ether, a polyvinylidene fluoride, or a poly(vinylidene fluoride-hexafluoropropylene).

In some embodiments, a thickness ratio of the substrate layer to the surface treatment layer is 2:1 to 50:1, 2:1 to 40:1, 2:1 to 30:1, or 2:1 to 20:1.

A person skilled in the art understands that the electrochemical device according to this application may be a lithium-ion battery or any other appropriate electrochemical device. To the extent not departing from the content disclosed herein, the electrochemical device according the embodiments of this application includes any device in which an electrochemical reaction occurs. Specific examples of the electrochemical device include all kinds of primary batteries, secondary batteries, solar batteries, or capacitors. Especially, the electrochemical apparatus is a lithium secondary battery, including a lithium metal secondary battery, a lithium-ion secondary battery, a lithium polymer secondary battery, or a lithium-ion polymer secondary battery.

The electrochemical device according to this application may be used for any purposes not particularly limited, and may be used for any purposes known in the prior art. According to some embodiments of this application, the electrochemical device according to this application may be used to make an electronic device. The electronic device includes, but is not limited to, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

The following uses a lithium-ion battery as an example to further describe the technical solution of this application with reference to comparative embodiments and embodiments, but this application is not limited to such embodiments. A person skilled in the art understands that the preparation method described herein is merely exemplary. Any modification or equivalent replacement made to the technical solutions of this application without departing from the scope of the technical solutions of this application shall fall within the protection scope of this application.

EMBODIMENTS

Preparing a Lithium-Ion Battery

According to the following method, a lithium-ion full battery is prepared by using the positive active material disclosed in the embodiments and comparative embodiments.

(1) Preparing a positive electrode: mixing the positive active material prepared according to the following embodiments and comparative embodiments, Super P as a conductive agent, and polyvinylidene difluoride (PVDF) at a weight ratio of 97.7:1.3:1.0, fully stirring and evenly mixing them in N-methyl-pyrrolidone to prepare a positive electrode slurry, coating a positive current collector aluminum foil with the obtained positive electrode slurry evenly, drying the aluminum foil at 85° C. to obtain a positive active material layer, and then performing cold calendering, slitting, and cutting, and welding a positive electrode tab to obtain a positive electrode.

(2) Preparing a negative electrode: mixing artificial graphite, sodium carboxymethyl cellulose (CMC), and styrene butadiene rubber (SBR), at a weight ratio of 97:1:2, fully stirring and evenly mixing them in deionized water to make a negative electrode slurry; coating a negative current collector copper foil with the negative electrode slurry evenly, and drying the copper foil at 85° C. to form a negative active material layer, and then performing cold calendering, slitting, and cutting, and welding a negative electrode tab to obtain a negative electrode.

(3) Preparing an electrolytic solution: mixing ethylene carbonate (EC), propylene carbonate (PC), and diethyl carbonate (DEC) in a dry argon atmosphere glovebox at a mass ratio of 15:25:60, adding an additive, dissolving and fully stirring the mixture, and then adding a lithium salt $LiPF_6$, and mixing them evenly to obtain an electrolytic solution. The concentration of $LiPF_6$ is 1.20 mol/L. Specific types and content of the additives used in the electrolytic solution are shown in Table 1 to Table 3.

(4) Preparing a separator: using polyethylene (PE) of a 9 μm thickness as a separator, dispersing inorganic particles (a mass ratio of flake boehmite to $Al_2O_3$ is 70:30) evenly into polyvinylidene difluoride (PVDF) to obtain a slurry, coating both a front side and a back side of the separator with the slurry, and performing drying to obtain a separator, with a total thickness of the coating being 3 μm.

(5) Assembling a lithium-ion battery: stacking the positive electrode, the separator, and the negative electrode sequentially, placing the separator between positive electrode and the negative electrode to serve a separation function, winding them, and welding tabs to obtain a bare cell; putting the bare cell into an outer package made of an aluminum laminated film foil, and injecting the electrolytic solution prepared above, and performing steps such as vacuum packaging, standing, chemical formation, reshaping, and capacity test to obtain a pouch-type lithium-ion battery.

Method for Measuring the Mass of the Electrolytic Solution

Discharging the battery at a constant current of 0.1 C until the voltage reaches 2.8 V, weighing the battery and recording the weight of the battery as m0, then disassembling the battery, and immediately putting the bare cell derived from the disassembly and the outer package made of an aluminum laminated film foil into high-purity acetonitrile (purity≥99.9%) to undergo extraction; and testing a gas chromatography of a clear liquid derived from the extraction, so that the relative content of each component in the electrolytic solution is obtained; drying, in a vacuum oven, the bare cell that has been subjected to the extraction and the outer package made of an aluminum laminated film foil, weighing the total mass of the bare cell and the outer package, and recording the total weight as m1. The actual mass of each component in the battery is a product of (m0−m1) multiplied by a relative weight percent of the component.

Method for Measuring the Content of the Element a in the Positive Electrode

Taking out the positive electrode from the bare cell dried in the foregoing mass test of the electrolytic solution, weighing the positive electrode derived from the disassembly and recording the mass of the positive electrode as m2; selecting, on the positive electrode, a region coated with the positive active material on both sides, and stamping the region to obtain a small wafer whose diameter is 18 mm; weighing the wafer, and recording the mass of the wafer as m3; preparing 10 wafers obtained in such a way, fully dissolving the wafers in aqua regia, then performing vacuum filtration, and rinsing with 20 mL purified water; repeating the foregoing process twice to obtain a filtrate; transferring the filtrate to a volumetric flask and bringing the solution to a predetermined volume of 100 mL; and measuring the concentration by using an inductively coupled plasma (ICP) standard curve, where the measured concentration of the element A is c0 (mg/L); and calculating the total mass (m4) of the substrate in the positive electrode according to the thickness and length of the positive electrode, where the mass of the positive current collector corresponding to a water with a diameter of 18 mm is m5: the mass of the element A in the battery is c0×100×(m2−m4)/(m3−m5).

If just one side of the positive electrode is coated with the positive active material, the mass of the positive active material per unit area is a half of the mass of the positive active material of the positive electrode coated on both sides.
Test of a Cross-Sectional Area of the Particles of the Positive Active Material and a Percentage of the Cross-Sectional Area Using an ion beam cross section polisher (model: JEOL-IB-09010CP) to cut the positive electrode along a direction perpendicular to the positive current collector to obtain a cross section; and observing the cross section by using a scanning electron microscope at an appropriate magnification; taking an image in a backscatter diffraction mode; recognizing the particles A, the broken particles in the particles A, and the current collector by using the function of the Image J software that enables recognition of a topography, and calculating the corresponding areas. The total area of the cross section of the positive electrode plate is S, the total area of the particles A is $S_1$ (including the broken particles), the total area of the broken particles in the particles A is $S_2$, the area of the positive current collector is $S_3$, and a porosity is P. The area percent of the conductive agent and the binder is ignored. In this application, the circularity of the particle A is greater than or equal to 0.4, and the cross-sectional area of a single particle A is greater than or equal to 20 μm².

The percentage of the total area of the particles A in the total area of the cross section=$S_1$/S×100%;

The percentage of the total area of broken particles of the particles A in the total area of the cross section=S2/S×100%;

The percentage of the total area of the broken particles in the total area of the particles A=$S_2$/$S_1$×100%; and The percentage of the total area of the particles B in the total area of the cross section=(S−$S_1$−$S_3$)/S×100%−P.
Test of the Thickness of the Substrate Layer and the Surface Treatment Layer of the Separator Using an ion beam cross section polisher (model IB-19530CP) to ionize argon with an ion source; performing acceleration and focusing, and then polishing the cross section of the separator; and observing the thickness of the separator and the surface coating by using a scanning electron microscope along a direction perpendicular to the polished surface.
Test of the Thickness Change Rate and the Cycle Performance of Lithium-Ion Battery Putting the lithium-ion battery in the embodiments and comparative embodiments into a 45° C. thermostat, and leaving battery to stand for 30 minutes; charging the lithium-ion battery at a constant current of 1.0 C until the voltage reaches 4.2V, and then charging the battery at a constant voltage of 4.2 V until the current reaches 0.05 C; then discharging the battery at a constant current of 4 C until the voltage reaches 2.8 V, thereby completing a charge and discharge cycle; performing 600 charge and discharge cycles according to the foregoing process; recording the first discharge capacity as $C_1$, recording the discharge capacity after 600 cycles as $C_{600}$, and using the following formula to calculate the cycle capacity retention rate: ($C_{600}$/$C_1$)×100%, which is a high-temperature cycle capacity retention rate;

using a micrometer to measure the initial thickness of the lithium-ion battery in the embodiments and the comparative embodiments, recording the initial thickness as $\eta_1$, using the micrometer to measure the thickness of the lithium-ion battery in the embodiments and the comparative embodiments after 600 charge and discharge cycles, and recording the measured thickness as $\eta_2$; and using the following formula to calculate the thickness change rate of the lithium-ion battery: ($\eta_2$/$\eta_1$)×100%.

The method for testing the normal-temperature cycle capacity retention rate is the same as the method for testing the high-temperature cycle capacity retention rate, except that the temperature is 25° C.
Interval Cycle (ITC) Test of the Lithium-Ion Battery Putting the lithium-ion battery in the embodiments and comparative embodiments into a 45° C. thermostat, and leaving battery to stand for 30 minutes; discharging the lithium-ion battery at a current of 0.5 C until the voltage reaches 3.0 V, and then charging the battery at a current of 1 C until the voltage reaches 4.2 V, and leaving the battery to stand for 24 hours, thereby completing a charge and discharge cycle; performing 100 charge and discharge cycles according to the foregoing process; recording the first discharge capacity as $C_0$, recording the discharge capacity after 100 cycles as $C_{100}$, and using the following formula to calculate the cycle capacity retention rate: ($C_{100}$/$C_0$)×100%;

using a micrometer to measure the initial thickness of the lithium-ion battery in the embodiments and the comparative embodiments, recording the initial thickness as $\eta_1$, using the micrometer to measure the thickness of the lithium-ion battery in the embodiments and the comparative embodiments after 100 charge and discharge cycles, and recording the measured thickness as $\eta_3$; and using the following formula to calculate the thickness change rate of the lithium-ion battery: ($\eta_3$/$\eta_1$)×100%.
Test of the Discharge Capacity Retention Rate of the Lithium-Ion Battery Putting the lithium-ion battery into a high and low temperature test chamber, adjusting the temperature to 25° C. first, and leaving the battery to stand for 30 minutes; charging the lithium-ion battery at a current of 0.5 C until the voltage reaches 4.2 V, and charging the battery at a constant voltage until the current reaches 0.02 C; leaving the battery to stand for 10 minutes; discharging the battery at a current of 0.5 C until the voltage reaches 3.0 V, and recording the discharge capacity as D0; charging the battery at a constant current of 0.5 C until the voltage reaches 4.2 V, and charging the battery at a constant voltage until the current reaches 0.02 C; adjusting the temperature of the high and low temperature test chamber to −20° C., leaving the battery to stand for 30 minutes, discharging the battery at a constant current of 0.5 C until the voltage reaches 3.0 V, and recording the capacity as D1: discharge capacity retention rate=D1/D0×100%.

The following describes in detail the specific implementations of this application.

Embodiment 1-1 to Embodiment 1-33 and Comparative Embodiment 1-1 to Comparative Embodiment 1-3

The positive active material used in the embodiments and comparative embodiments in Table 1 is Li($Ni_{0.8}Co_{0.1}Mn_{0.1}$)$A_cO_2$, where the subscript c of the element A depends on the content of the element A. In addition, all the positive active materials used in the embodiments and the comparative embodiments in Table 1 include a first particle of a circularity not less than 0.4 and a second particle of a circularity less than 0.4.

In Embodiment 1-1 to Embodiment 1-33 and Comparative Embodiment 1-1 to Comparative Embodiment 1-3, the cross section of the positive electrode is analyzed by a scanning electron microscope, with the cross section being perpendicular to the current collector. Based on the total area of the cross section of the positive electrode, the total cross-sectional area of the first particles accounts for 22.4%, and the total cross-sectional area of the second particles accounts for 44.3%.

TABLE 1

| | Element A | Structural formula I | | | LiPO$_2$F$_2$ dosage (g) | Normal-temperature cycle capacity retention rate | High-temperature cycle test | | ITC test | |
|---|---|---|---|---|---|---|---|---|---|---|
| | Element and dosage (g) | (I-8) dosage (g) | Type | Dosage (g) | | | Capacity retention rate | Thickness change | Capacity retention rate | Thickness change |
| Comparative Embodiment 1-1 | \ | \ | \ | \ | \ | 83.65% | 78.92% | 18.68% | 63.12% | 30.31% |
| Comparative Embodiment 1-2 | \ | 0.4 | \ | \ | \ | 84.41% | 80.21% | 14.72% | 64.32% | 27.96% |
| Comparative Embodiment 1-3 | 0.04 Al + 0.01 Zr | | \ | \ | \ | 84.58% | 80.88% | 14.91% | 64.11% | 27.23% |
| Embodiment 1-1 | 0.0008 Al + 0.0002 Zr | 0.05 | \ | \ | \ | 89.94% | 85.11% | 11.67% | 68.05% | 20.87% |
| Embodiment 1-2 | 0.008 Al + +0.002 Zr | 0.05 | \ | \ | \ | 90.59% | 86.37% | 11.15% | 69.85% | 20.31% |
| Embodiment 1-3 | 0.04 Al + 0.01 Zr | 0.01 | \ | \ | \ | 91.08% | 87.86% | 10.92% | 69.88% | 20.30% |
| Embodiment 1-4 | 0.04 Al + 0.01 Zr | 0.05 | \ | \ | \ | 91.42% | 88.02% | 10.62% | 73.11% | 18.83% |
| Embodiment 1-5 | 0.04 Al + 0.01 Zr | 0.1 | \ | \ | \ | 91.85% | 88.07% | 10.23% | 73.45% | 18.54% |
| Embodiment 1-6 | 0.04 Al + 0.01 Zr | 0.4 | \ | \ | \ | 92.84% | 88.13% | 9.70% | 73.05% | 18.24% |
| Embodiment 1-7 | 0.04 Al + 0.01 Zr | 0.8 | \ | \ | \ | 93.03% | 88.73% | 9.11% | 72.55% | 18.24% |
| Embodiment 1-8 | 0.04 Al + 0.01 Zr | 1 | \ | \ | \ | 93.15% | 87.68% | 9.44% | 72.14% | 18.28% |
| Embodiment 1-9 | 1.3 Al + +0.2 Zr | 0.4 | \ | \ | \ | 93.21% | 87.74% | 9.38% | 72.22% | 18.24% |
| Embodiment 1-10 | 0.04 Al + 0.01 Ti | 0.4 | \ | \ | \ | 92.80% | 87.72% | 9.40% | 72.20% | 18.25% |
| Embodiment 1-11 | 0.04 Al + 0.01 Zr | 0.4 | \ | \ | 0.001 | 93.91% | 89.53% | 8.13% | 74.44% | 17.05% |
| Embodiment 1-12 | 0.04 Al + 0.01 Zr | 0.4 | \ | \ | 0.005 | 93.97% | 90.14% | 8.13% | 74.54% | 17.05% |
| Embodiment 1-13 | 0.04 Al + 0.01 Zr | 0.4 | \ | \ | 0.009 | 94.36% | 90.48% | 8.03% | 75.14% | 16.85% |
| Embodiment 1-12 | 0.04 Al + 0.01 Zr | 0.4 | \ | \ | 0.02 | 94.85% | 90.78% | 8.33% | 75.02% | 16.66% |
| Embodiment 1-14 | 0.04 Al + 0.01 Zr | 0.4 | \ | \ | 0.06 | 94.86% | 89.67% | 8.74% | 74.71% | 16.95% |
| Embodiment 1-15 | 0.04 Al + 0.01 Zr | 0.4 | \ | \ | 0.1 | 94.83% | 88.92% | 8.85% | 73.52% | 17.97% |
| Embodiment 1-16 | 0.04 Al + 0.01 Zr | 0.4 | \ | \ | 0.5 | 94.78% | 87.03% | 8.77% | 72.56% | 17.92% |
| Embodiment 1-17 | 0.04 Al + 0.01 Zr | \ | Formula (I-3) | 0.4 | \ | 92.88% | 87.13% | 10.47% | 71.95% | 19.20% |
| Embodiment 1-18 | 0.04 Al + 0.01 Zr | 0.1 | Formula (I-3) | 0.1 | \ | 92.06% | 88.49% | 10.30% | 72.42% | 19.38% |
| Embodiment 1-19 | 0.04 Al + 0.01 Zr | 0.05 | Formula (I-3) | 0.3 | \ | 92.83% | 88.62% | 10.11% | 72.48% | 19.32% |
| Embodiment 1-20 | 0.04 Al + 0.01 Zr | 0.1 | Formula (I-3) | 0.3 | \ | 92.92% | 89.27% | 10.04% | 73.31% | 19.18% |
| Embodiment 1-21 | 0.04 Al + 0.01 Zr | 0.2 | Formula (I-3) | 0.8 | \ | 92.80% | 89.86% | 9.98% | 73.52% | 19.03% |
| Embodiment 1-22 | 0.04 Al + 0.01 Zr | 0.02 | Formula (I-3) | 0.3 | \ | 92.85% | 88.45% | 10.27% | 72.43% | 19.35% |
| Embodiment 1-23 | 0.04 Al + 0.01 Ti | 0.05 | Formula (I-3) | 0.3 | \ | 92.90% | 89.17% | 10.03% | 72.81% | 19.15% |
| Embodiment 1-24 | 0.8 Al + +0.2 Zr | 0.05 | Formula (I-3) | 0.3 | \ | 93.15% | 89.36% | 10.02% | 73.02% | 19.03% |
| Embodiment 1-25 | 0.04 Al + 0.01 Zr | 0.05 | Formula (I-1) | 0.3 | \ | 92.88% | 88.95% | 10.21% | 72.64% | 19.45% |
| Embodiment 1-26 | 0.04 Al + 0.01 Zr | 0.05 | Formula (I-2) | 0.3 | \ | 92.84% | 88.72% | 10.14% | 72.50% | 19.40% |
| Embodiment 1-27 | 0.04 Al + 0.01 Zr | 0.05 | Formula (I-3) | 0.3 | 0.1 g | 93.10% | 90.11% | 9.26% | 73.92% | 17.48% |
| Embodiment 1-28 | 0.04 Al + 0.01 Zr | 0.05 | Formula (I-3) | 0.3 | 0.2 g | 93.36% | 90.78% | 9.18% | 74.92% | 16.48% |
| Embodiment 1-29 | 0.04 Al + 0.01 Zr | 0.05 | Formula (I-3) | 0.3 | 0.15 g | 93.23% | 91.07% | 9.06% | 74.92% | 16.48% |
| Embodiment 1-30 | 0.03 Mg + 0.01 Zr | 0.4 | \ | \ | \ | 92.81% | 87.56% | 10.51% | 71.96% | 19.08% |

TABLE 1-continued

| | Element A | Structural formula I | | | LiPO$_2$F$_2$ dosage (g) | Normal-temperature cycle capacity retention rate | High-temperature cycle test | | ITC test | |
|---|---|---|---|---|---|---|---|---|---|---|
| | Element and dosage (g) | (I-8) dosage (g) | Type | Dosage (g) | | | Capacity retention rate | Thickness change | Capacity retention rate | Thickness change |
| Embodiment 1-31 | 0.03 Mg + 0.01 Zr | 0.05 | Formula (I-3) | 0.3 | | 92.79% | 88.54% | 10.48% | 72.50% | 20.29% |
| Embodiment 1-32 | 0.03 Al + 0.01 Zr + 0.02 B | 0.4 | \ | \ | \ | 93.02% | 87.60% | 10.49% | 71.98% | 19.06% |
| Embodiment 1-33 | 0.03 Al + +0.02 Ti | 0.4 | \ | \ | \ | 92.89% | 87.57% | 10.50% | 71.95% | 19.07% |

Note 1:
The content of the element A in Table 1 means the total mass of the element A added into the battery, measured in grams; and the dosage of the compound represented by the structural formula I in Table 1 means the mass of the compound represented by the structural formula I and added into the battery, measured in grams.

In contrast with Comparative Embodiment 1-1 to Comparative Embodiment 1-3, the positive active material in Embodiment 1-1 to Embodiment 1-9 is doped with Al and Zr, and the positive active material in Embodiment 1-10 is doped with Al and Ti, the compound represented by Formula (I-8) is added into the electrolytic solution, and the mass ratio of the doping elements to the compound represented by Formula (I-8) is in the range of 1:0.2 to 1:50. Referring to the electrochemical data, in both conventional high-temperature cycle test and the ITC test, in contrast with Comparative Embodiment 1-1 to Comparative Embodiment 1-3, the cycle stability of the electrochemical devices in Embodiment 1-1 to Embodiment 1-10 is better, and the thickness change between the battery before the cycling and the battery after the cycling is smaller (indicating a lower degree of gas generation). This conclusively shows that the doping elements in the positive active material can interact with the molecules represented by the structural formula I in the electrolytic solution to form an effective protective film on the surface of the particles of the positive active material, thereby reducing the side effects between the particles of the positive active material and the electrolytic solution, and improving the cycle stability of the electrochemical device.

Embodiment 1-11 to Embodiment 1-16 are compared with Embodiment 1-6. In Embodiment 1-11 to Embodiment 1-16, an amount of LiPO$_2$F$_2$ is further added into the electrolytic solution. As can be learned from the electrochemical data, in contrast with Embodiment 1-6, the electrochemical devices in Embodiment 1-11 to Embodiment 1-16 exhibit better cycle stability and a lower level of gas generation. Similarly, Embodiment 1-27 to Embodiment 1-29 correspond to Embodiment 1-23, and make improvements by adding an amount of LiPO$_2$F$_2$ into the electrolytic solution. As can be learned from the electrochemical data, in contrast with Embodiment 1-23, the electrochemical performance of the electrochemical devices in Embodiment 1-27 to Embodiment 1-29 is better. That is because the added LiPO$_2$F$_2$ effectively forms a protective layer on the surfaces of the positive electrode and the negative electrode, and reduces the resistance and facilitates ion transmission.

In Embodiment 1-17, the compound represented by Formula (I-8) in the electrolytic solution is replaced with the compound represented by Formula (I-3), and the electrolytic solutions in Embodiment 1-18 to Embodiment 126 further contains a mixture of the compound represented by Formula (I-8) and one of the compounds represented by Formulas (I-1) to (I-3). As can be learned from the electrochemical data, on the whole, the electrochemical performance of the electrochemical devices in Embodiment 1-17 to Embodiment 1-26 is basically equivalent to the electrochemical performance of the electrochemical devices in Embodiment 1-1 to Embodiment 1-10. However, the advantage of Embodiment 1-17 to Embodiment 1-26 is that the dosage of the compound represented by Formula (I-8) is reduced, which is commercially significant.

In Embodiment 1-30 to Embodiment 1-33, the positive active material is doped with other elements. As can be learned from the electrochemical data, the electrochemical devices in Embodiment 1-30 to Embodiment 1-33 exhibit high cycle stability and a low level of gas generation.

Embodiment 2-1 to Embodiment 2-11

Embodiment 2-1 to Embodiment 2-11 correspond to Embodiment 1-6, and make improvements by further adding a compound represented by Formula II into the electrolytic solution. As can be learned from the electrochemical data, in contrast with Embodiment 1-6, the cycle stability of the electrochemical devices in Embodiment 2-1 to Embodiment 2-5 under normal temperatures is slightly reduced, but the discharge performance of the electrochemical devices under low temperatures is further improved. Referring to the data in Embodiment 2-6 to Embodiment 2-8, a mixture of the compound represented by Formula (I-8) and the compound represented by Formula (I-3) is added into the electrolytic solution of the electrochemical device, and therefore, the cycle stability and the low-temperature discharge performance of the electrochemical device are improved in contrast with Embodiment 1-6. Further, as can be learned from the data in Embodiment 2-9 to Embodiment 2-11, LiPO$_2$F$_2$ is further added into the electrolytic solution, so that the electrochemical performance of the electrochemical device is further improved. This indicates that the added compound represented by Formula II further improves the low-temperature discharge performance and the normal-temperature cycle performance of the electrochemical device. On this basis, the use of the compound represented by Formula I and LiPO$_2$F$_2$ can effectively improve the cycle performance of the electrochemical device, reduce the resistance, and further improve the discharge capacity retention rate.

TABLE 2

| | Formula (I-8) dosage (g) | Structural formula I Type | Dosage (g) | LiPO$_2$F$_2$ Content (g) | Compound in Formula II Type | Content | Normal-temperature cycle test Capacity retention rate | Discharge capacity retention rate |
|---|---|---|---|---|---|---|---|---|
| Embodiment 1-6 | 0.4 | | | | | | 92.84% | 78.04% |
| Embodiment 2-1 | 0.4 | | | | II-2 | 1% | 91.03% | 79.58% |
| Embodiment 2-2 | 0.4 | | | | II-2 | 5% | 91.15% | 79.35% |
| Embodiment 2-3 | 0.4 | | | | II-2 | 10% | 91.30% | 81.13% |
| Embodiment 2-4 | 0.4 | | | | II-2 | 15% | 91.48% | 81.30% |
| Embodiment 2-5 | 0.4 | | | | II-2 | 20% | 90.96% | 80.12% |
| Embodiment 2-6 | 0.05 | Formula (I-3) | 0.3 | | II-2 | 10% | 94.20% | 81.15% |
| Embodiment 2-7 | 0.05 | Formula (I-3) | 0.3 | | II-2 | 5% | 93.97% | 79.40% |
| Embodiment 2-8 | 0.05 | Formula (I-3) | 0.2 | | II-2 | 10% | 94.07% | 81.18% |
| Embodiment 2-9 | 0.05 | Formula (I-3) | 0.3 | 0.08 | II-2 | 5% | 94.23% | 79.43% |
| Embodiment 2-10 | 0.05 | Formula (I-3) | 0.3 | 0.07 | II-2 | 10% | 94.43% | 81.22% |
| Embodiment 2-11 | 0.05 | Formula (I-3) | 0.3 | 0.05 | II-2 | 0.1% | 92.46% | 70.23% |

Embodiment 3-1 to Embodiment 3-11

Embodiment 3-9 differs from Embodiment 1-19 in that a first additive is further added in the electrolytic solution of Embodiment 3-9. In contrast with Embodiment 1-19, the electrochemical device in Embodiment 3-9 exhibit better cycle stability and a lower level of gas generation. In Embodiment 3-1 to Embodiment 3-8 and Embodiment 3-10 to Embodiment 3-11, a combination of the first additive and/or the second additive and the compound represented by Formula II is added in the electrolytic solution. As can be learned from the electrochemical data, the electrochemical devices corresponding to such embodiments exhibit excellent electrochemical performance, especially excellent cycle stability and a low level of gas generation. A main reason is that the oxidation potential of the first additive and/or the second additive is lower than that of the compound represented by Formula I, and the reduction potential is higher than that of the compound represented by Formula I, and the first additive and/or the second additive can form a protective layer on the electrode surface before the compound represented by Formula I forms the protective layer, thereby reducing side reactions and ensuring the stability of the interface during cycles.

TABLE 3

| | First additive | Second additive | Compound in Formula II Type | Dosage | High-temperature cycle test Capacity retention rate | Thickness change | ITC test Capacity retention rate | Thickness change |
|---|---|---|---|---|---|---|---|---|
| Embodiment 1-19 | | | | | 88.62% | 10.11% | 72.48% | 19.32% |
| Embodiment 3-1 | 1.0% FEC | | Formula (II-2) | 5% | 90.05% | 10.52% | 74.23% | 17.18% |
| Embodiment 3-2 | 1.0%g FEC + 0.1% TPP | | Formula (II-2) | 5% | 90.48% | 10.11% | 74.87% | 16.53% |
| Embodiment 3-3 | 1.0% FEC + 0.8% HTCN | | Formula (II-2) | 5% | 90.62% | 10.10% | 75.36% | 15.21% |
| Embodiment 3-4 | | 0.3% LiDFOB | Formula (II-2) | 5% | 90.21% | 10.51% | 74.28% | 17.15% |
| Embodiment 3-5 | 1.0% FEC | 0.3% LiDFOB | Formula (II-2) | 5% | 90.70% | 10.05% | 75.39% | 15.18% |
| Embodiment 3-6 | 1.0% FEC + 0.8% HTCN | 1.5% LiFSI | Formula (II-2) | 5% | 91.22% | 9.90% | 75.41% | 15.02% |
| Embodiment 3-7 | 1.0% FEC | | Formula (II-2) | 20% | 89.63% | 11.55% | 73.32% | 19.21% |
| Embodiment 3-8 | 1.0% FEC | | Formula (II-2) | 0.10% | 90.95% | 9.60% | 75.52% | 14.83% |
| Embodiment 3-9 | 1.0% FEC | | | | 91.22% | 9.34% | 75.21% | 14.18% |
| Embodiment 3-10 | 3.0% FEC + +0.5% HTCN | | Formula (II-2) | 5% | 91.15% | 9.87% | 75.38% | 15.25% |
| Embodiment 3-11 | 2.5% FEC + +1% HTCN | | Formula (II-2) | 5% | 92.10%% | 9.22% | 76.17% | 14.95% |

Embodiment 4-1 to Embodiment 4-14 and Comparative Embodiment 4-1 to Comparative Embodiment 4-2

In the embodiments shown in Table 4-1, different positive active materials are doped with different elements A. The molecular formula of the positive active material before the doping, the type and content of the element A, and the percentages of the first particles and the second particles in the positive active material layer are shown in Table 4-1. In contrast with Comparative Embodiment 4-1, the $LiNi_{0.6}Co_{0.2}Mn_{0.2}O_2$ in the positive active material in Embodiment 4-1 and Embodiment 4-2 is doped with elements. Specifically, the positive active material is doped with elements, the compound represented by Formula (I) is added into the electrolytic solution, and the mass ratio of the doping element to the compound represented by Formula (I) is adjusted to a value within the range of 1:0.2 to 1:50. Therefore, as can be learned from the electrochemical data, the breakage rate of the first particles in the positive active material is further reduced, and the cycle stability of the corresponding electrochemical device is significantly improved, and the gas generation is mitigated. The same conclusion can be drawn from comparison between Comparative Embodiment 4-2 and Embodiment 4-3 to Embodiment 4-5.

In Embodiment 1-19 and Embodiment 4-6 to Embodiment 4-10, the $LiNi_{0.8}Co_{0.1}Mn_{0.1}O_2$ is doped with elements. As can be learned from the electrochemical data, the electrochemical devices corresponding to such embodiments exhibit excellent cycle performance and a relatively low level of gas generation. In addition, reducing the percentage of the first particles in the positive active material to an appropriate level can mitigate the breakage of the first particles during the preparation of the electrode plate and in the charge and discharge process of the electrochemical device, improve the cycle performance, and mitigate gas generation.

In Embodiment 3-3 and Embodiment 4-11 to Embodiment 4-14, the $LiNi_{0.8}Co_{0.1}Mn_{0.1}O_2$ is doped with elements. Embodiment 3-3 differs from Embodiment 4-11 to Embodiment 4-14 in the percentage of the total area of the first particles and the percentage of the total area of the second particles. As can be learned from comparison of Embodiment 3-3 and Embodiment 4-11 to Embodiment 4-12 versus Embodiment 4-13 and Embodiment 4-14, adjusting the percentages of the first particles and the second particles to a value within a specified range can achieve better cycle performance and mitigate gas generation.

TABLE 4-1

| | Positive active material before doping | Content of element A | Percentage of total area of first particles | Percentage of total area of second particles | Percentage of broken particles in first particles |
|---|---|---|---|---|---|
| Embodiment 1-19 | $LiNi_{0.8}Co_{0.1}Mn_{0.1}O_2$ | 0.04 Al + 0.01 Zr | 22.4% | 44.3% | 11.2% |
| Comparative Embodiment 4-1 | $LiNi_{0.6}Co_{0.2}Mn_{0.2}O_2$ | \ | 10.3% | 53.2% | 20.5% |
| Comparative Embodiment 4-2 | $LiCoO_2$ | \ | 4.5% | 62.8% | 5.3% |
| Embodiment 4-1 | $LiNi_{0.6}Co_{0.2}Mn_{0.2}O_2$ | 0.04 Al + 0.01 Zr | 8.5% | 55.9% | 8.0% |
| Embodiment 4-2 | $LiNi_{0.6}Co_{0.2}Mn_{0.2}O_2$ | 0.04 Al + 0.01 Zr | 15.7% | 48.9% | 13.0% |
| Embodiment 4-3 | $LiCoO_2$ | 0.04 Al + 0.01 Zr | 18.7% | 45.2% | 11.0% |
| Embodiment 4-4 | $LiCoO_2$ | 0.04 Al | 26.3% | 41.5% | 17.0% |
| Embodiment 4-5 | $LiCoO_2$ | 0.04 Al + 0.01 Zr | 31.2% | 33.2% | 19.0% |
| Embodiment 4-6 | $LiNi_{0.8}Co_{0.1}Mn_{0.1}O_2$ | 0.04 Al + 0.01 Zr | 15.3% | 50.5% | 14.0% |
| Embodiment 4-7 | $LiNi_{0.8}Co_{0.1}Mn_{0.1}O_2$ | 0.04 Al + 0.01 Zr | 40.1% | 25.4% | 22.0% |
| Embodiment 4-8 | $LiNi_{0.8}Co_{0.1}Mn_{0.1}O_2$ | 0.04 Al + 0.01 Zr | 35.2% | 32.1% | 19.8% |
| Embodiment 4-9 | $LiNi_{0.8}Co_{0.1}Mn_{0.1}O_2$ | 0.04 Al + 0.01 Zr | 47.2% | 18.1% | 25.4% |
| Embodiment 4-10 | $LiNi_{0.8}Co_{0.1}Mn_{0.1}O_2$ | 0.04 Al + 0.01 Zr | 50.2% | 12.4% | 38.0% |
| Embodiment 3-3 | $LiNi_{0.8}Co_{0.1}Mn_{0.1}O_2$ | 0.04 Al + +0.03 Zr | 22.4% | 44.3% | 10.0% |
| Embodiment 4-11 | $LiNi_{0.8}Co_{0.1}Mn_{0.1}O_2$ | 0.04 Al + +0.03 Zr | 13.1% | 51.4% | 9.5% |
| Embodiment 4-12 | $LiNi_{0.8}Co_{0.1}Mn_{0.1}O_2$ | 0.04 Al + +0.03 Zr | 32.2% | 33.2% | 15.7% |
| Embodiment 4-13 | $LiNi_{0.8}Co_{0.1}Mn_{0.1}O_2$ | 0.04 Al + +0.03 Zr | 0% | 64.5% | 0% |
| Embodiment 4-14 | $LiNi_{0.8}Co_{0.1}Mn_{0.1}O_2$ | 0.04 Al + +0.03 Zr | 63.2% | 0% | 40% |

TABLE 4-2

| | High-temperature cycle capacity retention rate | High-temperature cycle thickness change | ITC capacity retention rate | ITC thickness change |
|---|---|---|---|---|
| Embodiment 1-19 | 88.62% | 10.11% | 72.48% | 19.32% |
| Comparative Embodiment 4-1 | 85.88% | 17.57% | 65.36% | 26.83% |
| Comparative Embodiment 4-2 | 81.45% | 17.55% | 64.94% | 26.52% |
| Embodiment 4-1 | 87.22% | 12.86% | 68.13% | 23.75% |
| Embodiment 4-2 | 90.54% | 9.03% | 75.29% | 17.65% |
| Embodiment 4-3 | 88.42% | 9.57% | 73.65% | 17.32% |
| Embodiment 4-4 | 88.15% | 9.95% | 74.03% | 17.60% |
| Embodiment 4-5 | 88.27% | 9.74% | 74.92% | 17.63% |
| Embodiment 4-6 | 88.79% | 10.43% | 72.35% | 20.27% |
| Embodiment 4-7 | 87.75% | 12.03% | 71.58% | 22.65% |
| Embodiment 4-8 | 88.54% | 13.11% | 72.42% | 21.52% |
| Embodiment 4-9 | 88.60% | 9.46% | 72.53% | 18.41% |
| Embodiment 4-10 | 88.12% | 15.19% | 72.15% | 23.13% |
| Embodiment 3-3 | 88.58% | 10.25% | 72.45% | 19.30% |
| Embodiment 4-11 | 88.95% | 13.36% | 73.40% | 19.55% |
| Embodiment 4-12 | 88.05% | 11.03% | 72.13% | 19.05% |
| Embodiment 4-13 | 85.31% | 18.75% | 71.56% | 23.75% |
| Embodiment 4-14 | 85.84% | 19.62% | 71.16% | 27.45% |

The foregoing embodiments conclusively indicate that no matter whether a lithium cobalt oxide ($LiCoO_2$) system or a ternary material ($LiNi_{0.6}Co_{0.2}Mn_{0.2}O_2$ and $LiNi_{0.8}Co_{0.1}Mn_{0.1}O_2$) is doped with elements, the doped positive active material can interact with the molecules represented by the structural formula I in the electrolytic solution to ensure a high service life and a low level of gas generation of the electrochemical device throughout cycles.

In addition, a mixture of the first particles and the second particles is applied in the positive active material. The second particles can effectively mitigate the breakage of the first particles, reduce the side reactions between the particles of the positive active material and the electrolytic solution, and improve the cycle stability of the electrochemical device.

References to "embodiments", "some embodiments", "an embodiment", "another example", "example", "specific example" or "some examples" throughout the specification mean that at least one embodiment or example in this application includes specific features, structures, materials, or characteristics described in the embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment(s) or example(s) in this application. In addition, specific features, structures, materials, or characteristics herein may be combined in one or more embodiments or examples in any appropriate manner.

Although illustrative embodiments have been demonstrated and described above, a person skilled in the art understands that the above embodiments shall not be construed as a limitation on this application, and changes, replacements, and modifications may be made to the embodiments without departing from the spirit, principles, and scope of this application.

What is claimed is:

1. An electrochemical device, comprising:
a positive electrode;
a negative electrode;
a separator located between the positive electrode and the negative electrode; and
an electrolytic solution;
wherein the positive electrode comprises a positive current collector and a positive active material layer disposed on the positive current collector, the positive active material layer comprises a positive active material, the positive active material comprises an element A, and the element A is at least one selected from the group consisting of Al, B, Ca, Mg, Ti, Cu, Nb, Si, Zr, Y, and W; and
the electrolytic solution comprises at least one compound represented by Formula (I):

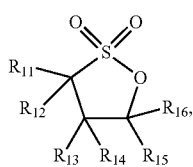

Formula (I)

wherein $R_{11}$, $R_{12}$, $R_{13}$, $R_{14}$, $R_{15}$, and $R_{16}$ are each independently selected from any combination of H, F, Cl, Br, I, phenyl, and substituted or unsubstituted $C_1$-$C_8$ hydrocarbyls, and
a mass ratio of the element A in the positive active material to the compound represented by Formula (I) is 1:0.2 to 1:50.

2. The electrochemical device according to claim 1, wherein the compound represented by Formula (I) comprises at least one of

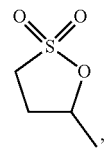

Formula (I-1)

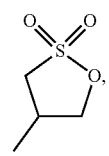

Formula (I-2)

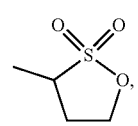

Formula (I-3)

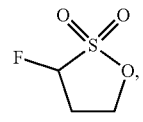

Formula (I-4)

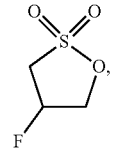

Formula (I-5)

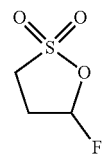

Formula (I-6)

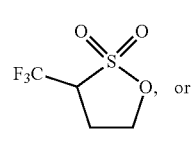

Formula (I-7)

or

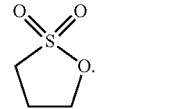

Formula (I-8)

3. The electrochemical device according to claim 2, wherein the electrolytic solution comprises a compound represented by Formula (I-8) and at least one of compounds represented by Formula (I-1) to Formula (I-7), wherein a mass ratio of a total mass of the compounds represented by Formula (I-1) to Formula (I-7) to a mass of the compound represented by Formula (I-8) is greater than 2:1.

4. The electrochemical device according to claim 1, wherein the electrolytic solution further comprises $LiPO_2F_2$, and a mass ratio of the element A to $LiPO_2F_2$ is 1:0.01 to 1:20.

5. The electrochemical device according to claim 1, wherein the electrolytic solution further comprises a compound represented by Formula (II),

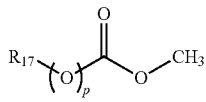

Formula (II)

wherein $R_{17}$ is a substituted or unsubstituted $C_1$-$C_8$ alkyl, p is 0 or 1, and
a content of the compound represented by Formula (II) is less than or equal to 20%, based on a total mass of the electrolytic solution.

6. The electrochemical device according to claim 1, wherein the electrolytic solution further comprises a first additive, the first additive comprises at least one of vinylene carbonate, fluoroethylene carbonate, ethylene sulfate, tris (trimethylsilyl)phosphate, tris(trimethylsilyl)borate, adiponitrile, succinonitrile, 1,3,6-hexanetricarbonitrile, 1,2,6-hexanetricarbonitrile, or 1,3,5-pentanetricarbonitrile; and a content of the first additive is 0.1% to 20%, based on a total mass of the electrolytic solution.

7. The electrochemical device according to claim 1, wherein the electrolytic solution further comprises a second additive, the second additive comprises at least one of lithium tetrafluoroborate, lithium bis(fluorosulfonyl)imide, lithium bis(trifluoromethylsulfonyl)imide, lithium 4,5-dicyano-2-(trifluoromethyl)imidazole, lithium difluorobis(oxalato)phosphate, lithium difluoro(oxalato)borate, or lithium bis(oxalato)borate; and a content of the second additive accounts for 0.1% to 5%, based on a total mass of the electrolytic solution.

8. The electrochemical device according to claim 1, wherein the positive active material layer comprises first particles, a circularity of each first particle is greater than or equal to 0.4, and a cross-sectional area of the first particle is greater than or equal to 20 μm²; and, based on a total area of a cross section of the positive electrode with the cross section being perpendicular to the current collector, a percentage of a total cross-sectional area of the first particles is 10% to 50%.

9. The electrochemical device according to claim 8, wherein the first particles comprise broken particles; and, based on the total area of the first particles, a total area of the broken particles is less than or equal to 30%.

10. The electrochemical device according to claim 1, wherein the positive active material layer comprises second particles, a circularity of each second particle is less than 0.4, and a cross-sectional area of the second particle is less than 20 μm²; and, based on a total area of a cross section of the positive electrode with the cross section being perpendicular to the current collector, a percentage of a total cross-sectional area of the second particles is 10% to 60%.

11. The electrochemical device according to claim 1, wherein the positive active material comprises at least one of a compound represented by Formula III or a compound represented by Formula IV:

   (III), wherein, 0.90≤n≤1.10, 0.05≤a≤0.3, 0.002≤b≤0.3, 0.001≤c≤0.1, 0≤m≤0.05, and 0.60<1-b-c<0.95;

   (IV), wherein 0.001≤e≤0.1, and 0≤f≤0.1, and
D is at least one selected from S, F, N, Cl, or I.

12. The electrochemical device according to claim 1, wherein the separator comprises a substrate layer and a surface treatment layer, the surface treatment layer comprises inorganic ceramic particles, and a thickness ratio of the substrate layer to the surface treatment layer is 2:1 to 20:1.

13. An electronic device, comprising an electrochemical device, the electrochemical device, comprises:
a positive electrode;
a negative electrode;
a separator located between the positive electrode and the negative electrode; and
an electrolytic solution;
wherein the positive electrode comprises a positive current collector and a positive active material layer disposed on the positive current collector, the positive active material layer comprises a positive active material, the positive active material comprises an element A, and the element A is at least one selected from the group consisting of Al, B, Ca, Mg, Ti, Cu, Nb, Si, Zr, Y, or W, and
the electrolytic solution comprises at least one compound represented by Formula (I):

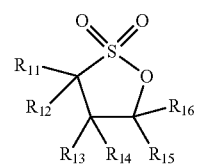

Formula (I)

wherein $R_{11}$, $R_{12}$, $R_{13}$, $R_{14}$, $R_{15}$, and $R_{16}$ are each independently selected from any combination of H, F, Cl, Br, I, phenyl, and substituted or unsubstituted $C_1$-$C_8$ hydrocarbyls, and
a mass ratio of the element A in the positive active material to the compound represented by Formula (I) is 1:0.2 to 1:50.

14. The electronic device according to claim 13, wherein the compound represented by Formula (I) comprises at least one of

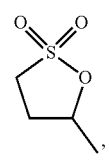

Formula (I-1)

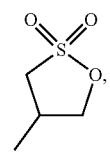

Formula (I-2)

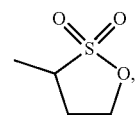

Formula (I-3)

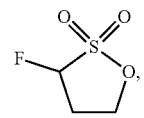

Formula (I-4)

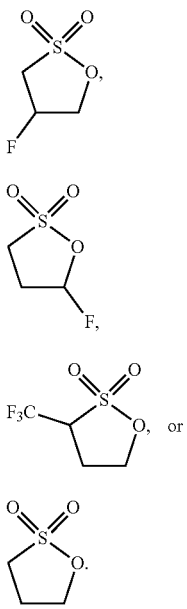

Formula (I-5)

Formula (I-6)

Formula (I-7)

Formula (I-8)

15. The electronic device according to claim 13, wherein the electrolytic solution comprises a compound represented by Formula (I-8) and at least one of compounds represented by Formula (I-1) to Formula (I-7), wherein a mass ratio of a total mass of the compounds represented by Formula (I-1) to Formula (I-7) to a mass of the compound represented by Formula (I-8) is greater than 2:1.

16. The electronic device according to claim 13, wherein the electrolytic solution further comprises $LiPO_2F_2$, and a mass ratio of the element A to $LiPO_2F_2$ is 1:0.01 to 1:20.

17. The electronic device according to claim 13, wherein the electrolytic solution further comprises a first additive, the first additive comprises at least one of vinylene carbonate, fluoroethylene carbonate, ethylene sulfate, tris(trimethylsilyl)phosphate, tris(trimethylsilyl)borate, adiponitrile, succinonitrile, 1,3,6-hexanetricarbonitrile, 1,2,6-hexanetricarbonitrile, or 1,3,5-pentanetricarbonitrile; and a content of the first additive is 0.1% to 20%, based on a total mass of the electrolytic solution.

18. The electronic device according to claim 13, wherein the electrolytic solution further comprises a second additive, the second additive comprises at least one of lithium tetrafluoroborate, lithium bis(fluorosulfonyl)imide, lithium bis(trifluoromethylsulfonyl)imide, lithium 4,5-dicyano-2-(trifluoromethyl)imidazole, lithium difluorobis(oxalato)phosphate, lithium difluoro(oxalato)borate, or lithium bis(oxalato)borate; and a content of the second additive accounts for 0.1% to 5%, based on a total mass of the electrolytic solution.

19. The electronic device according to claim 13, wherein the positive active material layer comprises first particles, a circularity of each first particle is greater than or equal to 0.4, and a cross-sectional area of the first particle is greater than or equal to 20 $\mu m^2$; and, based on a total area of a cross section of the positive electrode with the cross section being perpendicular to the current collector, a percentage of a total cross-sectional area of the first particles is 10% to 50%.

20. The electronic device according to claim 19, wherein the first particles comprise broken particles; and, based on the total area of the first particles, a total area of the broken particles is less than or equal to 30%.

* * * * *